US012583546B2

(12) United States Patent
Hairer

(10) Patent No.: US 12,583,546 B2
(45) Date of Patent: Mar. 24, 2026

(54) METHOD AND DEVICE FOR CONTROLLING A STEERING ASSISTANCE SYSTEM OF A STEERING DEVICE OF A SINGLE-TRACK MOTOR VEHICLE

(71) Applicant: Bayerische Motoren Werke Aktiengesellschaft, Munich (DE)

(72) Inventor: Michael Hairer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 7 days.

(21) Appl. No.: 18/859,586

(22) PCT Filed: Jun. 22, 2023

(86) PCT No.: PCT/EP2023/066988
§ 371 (c)(1),
(2) Date: Oct. 24, 2024

(87) PCT Pub. No.: WO2024/017558
PCT Pub. Date: Jan. 25, 2024

(65) Prior Publication Data
US 2025/0171102 A1     May 29, 2025

(30) Foreign Application Priority Data

Jul. 18, 2022     (DE) ..................... 10 2022 117 888.9

(51) Int. Cl.
*B62J 45/20*     (2020.01)
*B62J 45/40*     (2020.01)
*B62K 21/00*     (2006.01)

(52) U.S. Cl.
CPC .............. *B62J 45/20* (2020.02); *B62J 45/40* (2020.02); *B62K 21/00* (2013.01)

(58) Field of Classification Search
CPC . B62J 45/20; B62J 45/40; B62J 45/412; B62J 45/413; B62J 45/414; B62J 45/415; B62K 21/00; B62K 21/08
See application file for complete search history.

(56) References Cited

U.S. PATENT DOCUMENTS

2013/0066522 A1* 3/2013 Haas ...................... B62K 21/00
                                                        701/41
2019/0084639 A1* 3/2019 Toyota ................... B62J 45/422
                        (Continued)

FOREIGN PATENT DOCUMENTS

DE     10 2005 047 142 A1     4/2007
DE     10 2011 082 413 A1     3/2013
                        (Continued)

OTHER PUBLICATIONS

International Search Report (PCT/ISA/210) issued in PCT Application No. PCT/EP2023/066988 dated Sep. 28, 2023 with English translation (6 pages).
(Continued)

*Primary Examiner* — Jacob M Amick
(74) *Attorney, Agent, or Firm* — Crowell & Moring LLP

(57)     ABSTRACT

A method for controlling a steering assistance system of a steering device of a single-track motor vehicle. Current vehicle operating parameters are continuously recorded by way of a sensor system; and, subsequently the current vehicle operating parameters are compared with limit values stored in a control unit of the single-track motor vehicle in order to determine a lifting front wheel of the single-track motor vehicle for the corresponding vehicle operating parameters by way of the control unit. Then, if at least one of the limit values is reached and/or exceeded, the steering assistance system is controlled by way of the control unit in such a way that the steering device is aligned to a predefined
(Continued)

steering angle of the steering device, at which steering angle the steering device is prevented from wobbling.

11 Claims, 1 Drawing Sheet

(56)               References Cited

U.S. PATENT DOCUMENTS

| | | | |
|---|---|---|---|
| 2022/0212747 A1 | 7/2022 | Ogahara et al. | |
| 2022/0371676 A1* | 11/2022 | Lizuka | B62K 21/12 |
| 2025/0360973 A1* | 11/2025 | Pilon | B62D 37/04 |

FOREIGN PATENT DOCUMENTS

| | | |
|---|---|---|
| DE | 10 2017 200 693 A1 | 7/2018 |
| DE | 10 2019 121 876 A1 | 2/2021 |
| DE | 10 2020 101 641 A1 | 7/2021 |

OTHER PUBLICATIONS

German-language Written Opinion (PCT/ISA/237) issued in PCT Application No. PCT/EP2023/066988 dated Sep. 28, 2023 with English translation (7 pages).
German-language Search Report issued in German Application No. 10 2022 117 888.9 dated Jun. 9, 2023 with partial English translation (11 pages).

* cited by examiner

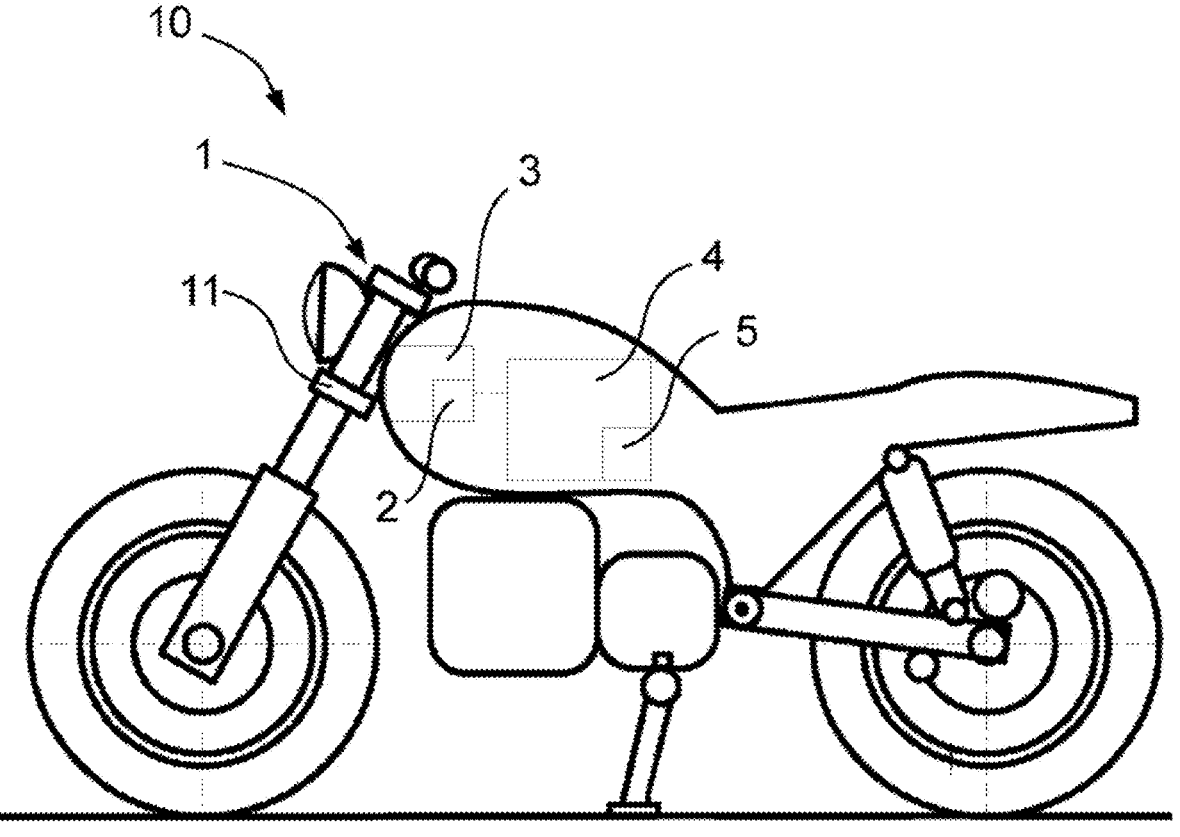

METHOD AND DEVICE FOR CONTROLLING A STEERING ASSISTANCE SYSTEM OF A STEERING DEVICE OF A SINGLE-TRACK MOTOR VEHICLE

BACKGROUND AND SUMMARY

This disclosure relates to a method for controlling a steering assistance system of a steering device of a single-track motor vehicle, and a single-track motor vehicle having a device for controlling a steering assistance system of a steering device of the single-track motor vehicle.

Kickback of a steering device of a single-track motor vehicle is a safety-critical phenomenon which occurs only when the front wheel lifts from the roadway and does not land on the roadway again in the direction of travel.

A large number of devices or methods for avoiding kickbacks are known from the prior art. A steering damper is typically used to avoid kickbacks in this case. The steering movement which ensures that the front wheel does not land in the direction of travel can be caused, inter alia, by lateral wind, uneven loading, an oblique obstacle or a bump, or a steering torque by the driver. Therefore, a steering damper is used in single-track vehicles, in particular in most high-performance vehicles, for example in sport bikes.

This has the disadvantage that the effects of a kickback are damped, but kickbacks still occur in attenuated form.

It is therefore an object of the present disclosure to provide a method and a device for a single-track motor vehicle, with which the cause of a kickback is prevented.

According to the disclosure, a method for controlling a steering assistance system of a steering device of a single-track motor vehicle is proposed, in which initially current vehicle operating parameters are continuously recorded by way of a sensor system and subsequently the current vehicle operating parameters are compared to limiting values stored in a control unit of the single-track motor vehicle to determine a lifting front wheel of the single-track motor vehicle for the corresponding vehicle operating parameters by way of the control unit. If at least one of the limiting values is reached and/or exceeded, the steering assistance system is thereupon controlled by way of the control unit such that the steering device is aligned at a predetermined steering angle of the steering device at which a kickback of the steering device is prevented.

A concept of the disclosure is to detect a lifting front wheel of a single-track motor vehicle and to align it before the front wheel lands again, alternatively during the entire phase of the lifting of the front wheel, such that a kickback or the single trigger for a kickback is precluded. The control unit controls the steering assistance system, which aligns the steering device at the corresponding steering angle. Furthermore, it is favorable that an additional steering damper can be omitted.

In one preferred embodiment of the disclosure, the control unit controls during the control of the steering assistance system by way of a steering actuator of the steering assistance system. It is favorable here that due to the steering actuator, in addition to the main function of the steering assistance, a steering damper can be dispensed with. Furthermore, the corresponding steering angle can be set precisely using a steering actuator and therefore a kickback can be prevented.

In one advantageous embodiment variant, it is provided that the control unit controls the steering angle of the steering device into a middle position with respect to a respective maximum steering angle or into a current direction of travel of the single-track motor vehicle during the control. In this way, the front wheel of the single-track motor vehicle is located in a position in which no kickbacks occur when the front wheel lands on the roadway again. The direction of travel is determined by way of a suitable sensor system during the continuous recording and the control unit controls the steering device to a corresponding steering angle.

In an exemplary embodiment according to the disclosure, the sensor system comprises a steering angle sensor and a steering angle of the steering device is ascertained during the continuous recording. It is thus known in which position the steering device is located and the control unit can control the steering device accordingly.

In a further embodiment variant of the disclosure, the sensor system comprises a rotation rate sensor and a rotational velocity of the single-track motor vehicle is ascertained during the continuous recording, in particular pitching around a transverse axis of the single-track motor vehicle. In a further advantageous variant, it is provided according to the disclosure that the sensor system comprises an inclination sensor and an angle of inclination of the single-track motor vehicle is ascertained during the continuous recording. In particular an angle of inclination between a front axle and a rear axle of the single-track motor vehicle. In addition, an embodiment is favorable in which the sensor system comprises a spring deflection sensor and a deflection of the steering device, in particular a suspension fork of the steering device, is ascertained during the continuous recording. Furthermore, it is advantageous if the sensor system comprises an acceleration sensor and an acceleration of the single-track motor vehicle, in particular in the vertical direction, is ascertained during the continuous recording. This has the advantage that these sensors are particularly suitable for determining a lifting front wheel of a single-track motor vehicle.

In a further embodiment of the disclosure, the control unit outputs a warning signal by way of a display device of the single-track vehicle if at least one of the limiting values is reached and/or exceeded. It is favorable here that the driver is made aware of a lifting front wheel of the single-track motor vehicle and at the same time of the risk of a kickback.

In an alternative embodiment of the present method, it is furthermore provided that the sensor system comprises a steering torque sensor and a steering torque of the steering device by a driver is ascertained during the continuous recording. The control unit factors in the steering torque in the control of the steering device here. The control of the steering device is thus more precise.

Furthermore, a single-track motor vehicle having a device for controlling a steering assistance system of a steering device of the single-track motor vehicle according to a method according to the above disclosure is proposed according to the disclosure, in which the steering assistance system is controllable by way of the control unit such that the steering device is aligned at a predetermined steering angle of the steering device, at which a kickback of the steering device is preventable.

The features disclosed above are combinable arbitrarily, provided that this is technically possible and they are not contradictory to one another.

BRIEF DESCRIPTION OF THE DRAWING

Other advantageous refinements of the disclosure are described in more detail hereinafter together with the description of the preferred embodiment of the disclosure on the basis of the FIGURE.

FIG. 1 shows a schematic representation of a single-track motor vehicle having a device for controlling a steering device of the single-track motor vehicle.

The schematic FIGURE is an example. Identical reference signs in the FIGURE indicate identical functional and/or structural features.

DETAILED DESCRIPTION OF THE DRAWING

FIG. 1 shows a schematic representation of a single-track motor vehicle 10 having a device for controlling a steering assistance system of a steering device 1 of the single-track motor vehicle 10, in which the steering assistance system is controllable by way of the control unit 4 such that the steering device 1 is aligned at a predetermined steering angle of the steering device 1, at which a kickback of the steering device 1 is preventable.

In the corresponding method for controlling the steering assistance system of the steering device 1 of the single-track motor vehicle 10, initially current vehicle operating parameters 2 are continuously recorded by way of a sensor system 3 and subsequently the current vehicle operating parameters 2 are compared to the limiting values 5 stored in the control unit 4 of the single-track motor vehicle 10 to determine a lifting front wheel of the single-track motor vehicle 10 for the corresponding vehicle operating parameters 2 by way of the control unit 4. If at least one of the limiting values 5 is reached and/or exceeded, at least the steering assistance system is thereupon controlled by way of the control unit 4 such that the steering device 1 is aligned at a predetermined steering angle of the steering device 1, at which a kickback of the steering device 1 is prevented.

In this case, the control unit 4 controls during the control of the steering assistance system by way of a steering actuator 11 of the steering assistance system and the steering angle of the steering device 1 into a middle position with respect to a respective maximum steering angle or into a current direction of travel of the single-track motor vehicle 10.

The sensor system 3 comprises a steering angle sensor and a steering angle of the steering device 1 is ascertained during the continuous recording. Furthermore, the sensor system 3 has a rotation rate sensor and a rotational velocity of the single-track motor vehicle 10 is ascertained during the continuous recording, in particular pitching around a transverse axis of the single-track motor vehicle 10. The sensor system 3 furthermore comprises an inclination sensor and an angle of inclination between the front axle and the rear axle of the single-track motor vehicle 10 is ascertained during the continuous recording. Moreover, the sensor system 3 has a spring deflection sensor, by way of which a deflection of the steering device, in particular a suspension fork of the steering device, is ascertained during the continuous recording. In addition, an acceleration of the single-track motor vehicle 10, in particular in a vertical direction, is ascertained by way of an acceleration sensor of the sensor system 3 during the continuous recording.

The sensor system 3 additionally comprises a steering torque sensor and ascertains a steering torque of the steering device 1 by a driver during the continuous recording. The corresponding steering torque by the driver is factored in during the control of the steering device 1 by way of the control unit.

In addition, the control unit 4 outputs a warning signal by way of a display device of the single-track motor vehicle 10 if at least one of the limiting values 5 is reached and/or exceeded.

The control unit 4 may comprise a controller (e.g., a processor, a microprocessor, a CPU, etc.) along with a storage (e.g., a memory, RAM, ROM, etc.) for storing software, logic, data, or the like. The control unit 4 may be associated with a traditional engine control unit (ECU), an engine control module (ECM), a motor control unit (MCU), or a body control module (BCM).

The disclosure is not restricted in its embodiment to the preferred exemplary embodiments specified above. Rather, a number of variants are conceivable which make use of the solution described even in fundamentally differently designed embodiments.

The invention claimed is:

1. A method for controlling a steering assistance system of a steering device of a single-track motor vehicle, the method comprising:

continuously detecting current vehicle operating parameters by way of a sensor system, comparing the current vehicle operating parameters to limiting values stored in a control unit of the single-track motor vehicle to determine a lifting front wheel of the single-track motor vehicle for the corresponding vehicle operating parameters by way of the control unit, wherein if at least one of the limiting values is reached and/or exceeded, the method further comprises controlling the steering assistance system by way of the control unit such that the steering device is aligned at a predetermined steering angle of the steering device, at which a kickback of the steering device is prevented.

2. The method according to claim 1, wherein the control unit controls during the control of the steering assistance system by way of a steering actuator of the steering assistance system.

3. The method according to claim 1, wherein the control unit controls the steering angle of the steering device into a middle position with respect to a respective maximum steering angle or into a current direction of travel of the single-track motor vehicle during the control.

4. The method according to claim 1, wherein the sensor system comprises a steering angle sensor and a steering angle of the steering device is ascertained during the continuous recording.

5. The method according to claim 1, wherein the sensor system comprises a rotation rate sensor and a rotational velocity of the single-track motor vehicle is ascertained during the continuous recording.

6. The method according to claim 1, wherein the sensor system comprises an inclination sensor and an angle of inclination of the single-track motor vehicle is ascertained during the continuous recording.

7. The method according to claim 1, wherein the sensor system comprises a spring deflection sensor and a deflection of the steering device is ascertained during the continuous recording.

8. The method according to claim 1, wherein the sensor system comprises an acceleration sensor and an acceleration of the single-track motor vehicle, in the vertical direction, is ascertained during the continuous recording.

9. The method according to claim 1, wherein the control unit outputs a warning signal by way of a display device of the single-track vehicle if at least one of the limiting values is reached and/or exceeded.

10. The method according to claim 1, wherein the sensor system comprises a steering torque sensor and a steering torque of the steering device by a driver is ascertained during the continuous recording, wherein the control unit factors in the steering torque in the control of the steering device.

11. A single-track motor vehicle comprising:

a device for controlling a steering assistance system of a steering device of the single-track motor vehicle according to the method of claim 1, wherein the steering assistance system is controllable by way of the control unit such that the steering device is aligned at a predetermined steering angle of the steering device, at which a kickback of the steering device is preventable.

\* \* \* \* \*